United States Patent [19]

Matsumura et al.

[11] Patent Number: 4,560,863
[45] Date of Patent: Dec. 24, 1985

[54] FOCUS DETECTING DEVICE

[75] Inventors: Susumu Matsumura; Takashi Suzuki; Kenji Suzuki, all of Kanagawa, Japan

[73] Assignee: Canon Kabushiki Kaisha, Tokyo, Japan

[21] Appl. No.: 527,210

[22] Filed: Aug. 29, 1983

[30] Foreign Application Priority Data

Aug. 30, 1982 [JP] Japan .................. 57-150520

[51] Int. Cl.[4] ............................. G01J 1/20
[52] U.S. Cl. .................. 250/201; 250/204; 354/407
[58] Field of Search ........... 250/201, 204, 208, 209; 354/406, 407, 408

[56] References Cited

U.S. PATENT DOCUMENTS 4,083,056 4/1978 Nakamura et al. ............. 250/201
4,223,988 9/1980 Jyojiki et al. .................. 354/407
4,297,571 10/1981 Utagawa et al. ............... 250/201

Primary Examiner—David C. Nelms
Attorney, Agent, or Firm—Toren, McGeady, Stanger, Goldberg & Kiel

[57] ABSTRACT

In a focus detecting device, an object's image formed on a prescribed image plane of a photo-taking lens is once again formed by a secondary imaging optical system disposed behind the prescribed image plane into two non-superposed object's images based on light flux portions symmetrically split relative to the optical axis of the photo-taking lens; light sensitive elements are respectively disposed in positions where these images of the object are reimaged by the secondary imaging optical system; and an in-focus state of the photo-taking lens is arranged to be detected by detecting the relative positional relation of these reformed images of the object by means of these light sensitive elements. The focus detecting device includes light splitting means which is arranged in the secondary imaging optical system to split a light flux coming from the exit pupil of the photo-taking lens into a middle part portion and a peripheral portion. With this arrangement, an object's image which becomes necessary as the F-number of the exit pupil of the photo-taking lens varies or an object's image which permits simultaneous use of another detecting method in the device can be obtained by the secondary imaging optical system.

10 Claims, 18 Drawing Figures

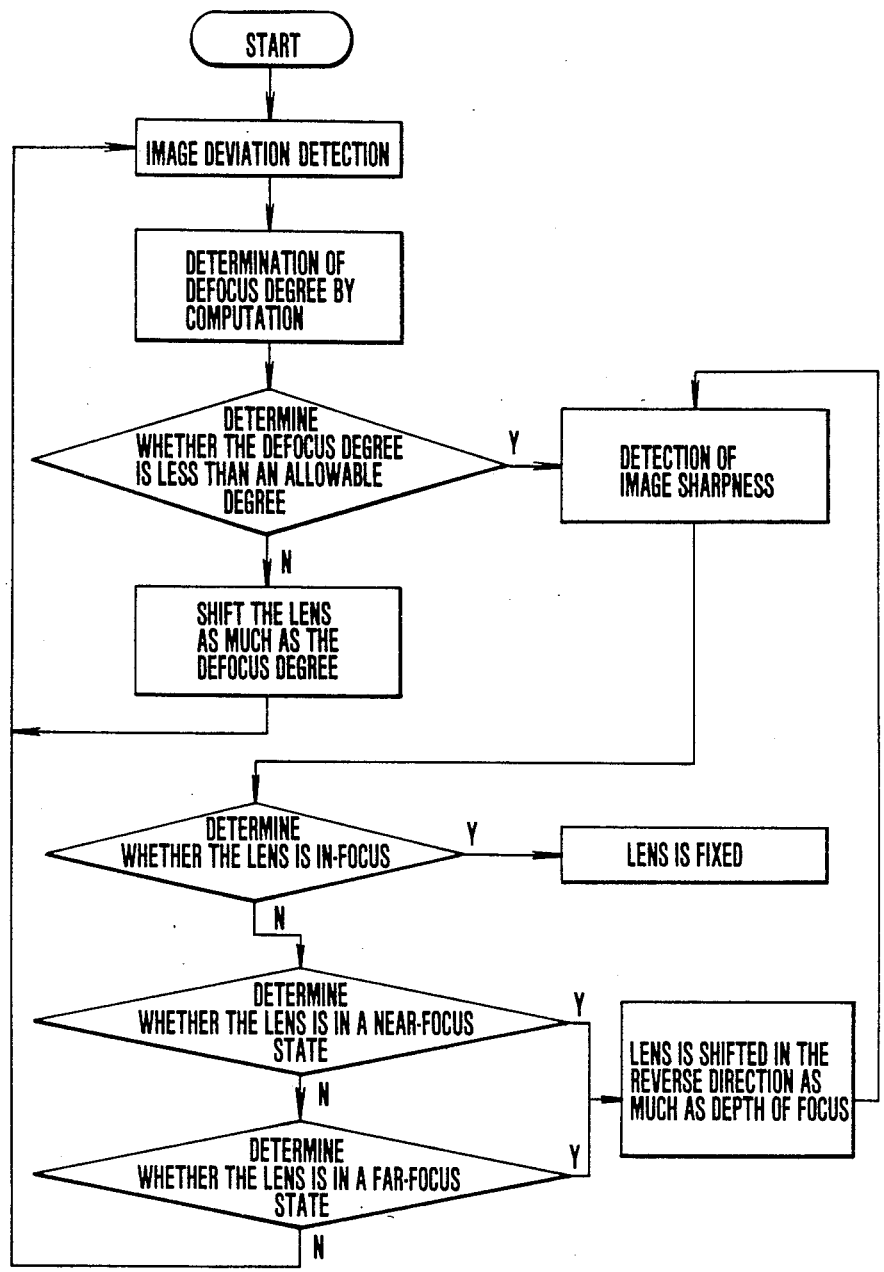

F I G.13(a)
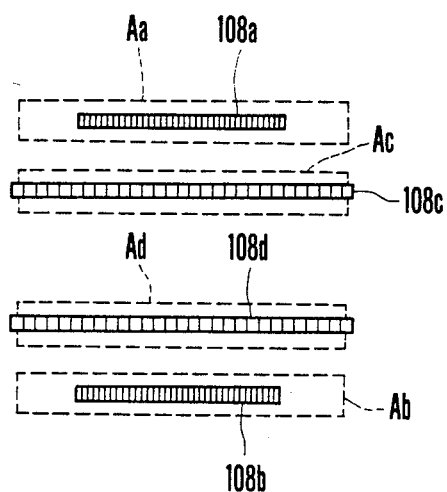
F I G.13(b)
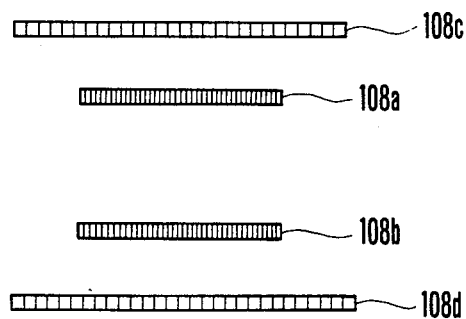

FOCUS DETECTING DEVICE

BACKGROUND OF THE INVENTION

1. Field of the Invention

This invention relates to a focus detecting device in an optical apparatus such as a photographic camera and particularly to a focus detecting device of a single-lens reflex camera or the like of the kind called the TTL type which is arranged to detect an in-focus state of a photo-taking lens of the apparatus through an imaging light flux coming from the photo-taking lens.

2. Description of the Prior Art

Known focus detecting devices of the kind using a so-called image displacement detecting method detect an in-focus state with a degree of defocus of an objective computed by detecting displacement in the relative positions of two images of an object formed with light from two different regions of the exist pupil of an objective. These known devices include, for example, a device disclosed by U.S. Pat. No. 3,875,401, issued Apr. 1, 1975. The focus detecting device of the prior art using the image displacement detecting method is provided with an optical system which is arranged as schematically shown in FIG. 1(a) of the accompanying drawings. Assuming that this device of the prior art is applied to a single-lens reflex camera adapted for use of interchangeable lenses, the device operates as follows: In case of the device shown in FIG. 1(a), the image of an object to be photographed which is formed on a prescribed image plane 2 by imaging light flux portions, 5a and 5b coming from peripheral parts of a photo-taking lens 1 is arranged to be once again formed on the surfaces of two light sensitive elements 4a and 4b by two secondary imaging lenses 3a and 3b respectively. Then, the relative positional relation of the two images of the object is detected via output signals of the two light sensitive elements 4a and 4b. The device thus determines whether the photo-taking lens 1 is in an in-focus state or in an out-of-focus state by signals produced from these photo sensitive elements. When the focus point of the photo-taking lens 1 deviates from the prescribed image plane and is thus in an out-of-focus or defocus state, the two images of the object re-imaged on the surfaces of the light sensitive elements 4a and 4b displace from a position obtained when the photo-taking lens is in the in-focus state and are thus located in different positions displaced in the direction perpendicular to an optical axis L. In that instance, the positional relation between the two object images formed on the light sensitive elements 4a and 4b is detected via the light sensitive elements. The defocus degree of the photo-taking lens 1 is thus directly obtained. The lens 1 is then shifted according to the defocus degree to bring it into an in-focus state.

In order that the in-focus state detection is accurately carried out in accordance with the image displacement detecting method, the light sensitive elements 4a and 4b must be arranged to have equal light quantity distribution. The term "equal light quantity distribution" as used here means that, when the object to be photographed has uniform brightness, the light quantity distribution on each of the light sensitive elements 4a and 4b is not only uniform but also equal to that of the other. However, in case where the photo-taking lens 1 mounted on a camera body is interchanged with a different photo-taking lens, the optical system shown in FIG. 1(a) comes to have a different maximum F-number of the photo-taking lens 1 and a different distance between the prescribed image plane 2 and the exit pupil. As a result, it becomes extremely difficult to equalize the light quantity distribution.

Some methods have already been proposed for equalizing the light quantity distribution. For example, the light quantity distribution equalizing methods of the prior art include a method disclosed by U.S. Pat. No. 4,322,616, issued Mar. 30, 1982. In that method, the light quantity distribution is equalized by providing light shielding plates 6a and 6b in front of the secondary imaging lenses 3a and 3b as shown in FIG. 1(b). With the light shielding plates 6a and 6b disposed directly in front of the secondary imaging lenses 3a and 3b, the brightness of the lenses 3a and 3b is substantially darkened to have the light quantity distribution on one of the light sensitive elements 4a and 4b virtually equalized with the other. However, a shortcoming of that method resides in that, in order to efficiently utilize the quantity of light incident on these light sensitive elements 4a and 4b, an aperture 6c formed by the light shielding plates 6a and 6b must be adjusted every time the maximum F-number value of the photo-taking lens 1 and the exit pupil position vary.

Another method of the prior art is proposed by Japanese Laid-Open Patent Application No. Sho 55-118019 (laid-open for public inspection Sept. 10, 1980) and is arranged as shown in FIG. 1(c) of the accompanying drawings. As shown, the arrangement includes four secondary imaging lenses 3a, 3b, 3c and 3d and four light sensitive elements 4a, 4b, 4c and 4d which form a total of four pairs of secondary imaging optical systems arranged in the rear of a lens 2a disposed in the vicinity of the image plane 2 of a photo-taking lens 1. The light sensitive elements 4a and 4b located on the inner side relative to the optical axis L and the light sensitive elements 4c and 4d on the outer side relative to the optical axis L are arranged to be selectively used from one to the other according to the increase or decrease of the focal length of the photo-taking lens 1 by means of a switch 7. The outputs of the pairs of the light sensitive elements which equalize the light quantity distribution (according to the above-stated difference of the photo-taking lens 1 mounted on the camera body) are compared by a phase comparison circuit 8 with each other to determine the degree of defocus of the photo-taking lens 1.

This method, however, necessitates use of four secondary imaging lenses 3a–3d and four light sensitive elements 4a–4d which must be arranged in a direction perpendicular to the optical axis L. As a result, the whole optical system becomes larger in size. A focus detection device according to such a method, therefore, has been hardly suited for use within cameras which have severely limited space available therein.

In the focus detecting device according to such an image displacement detecting method, the degree of displacement between the images formed by the secondary imaging optical systems is approximately proportional to the defocus degree of the photo-taking lens. Hence, a speedy automatic focusing operation can be carried out because the amount of movement and the direction of the movement of the photo-taking lens required for focusing can be readily determined from the detected degree of image displacement. Besides, it can rather efficiently detect whether the focused image is positioned forward to the prescribed image plane or backward to the prescribed image plane even in cases where images blur to a great extent on the prescribed image plane. While these are the advantages of the focus detecting device, a shortcoming of the device of this type resides in that: When the object to be photographed has a periodic pattern, a false peak might appear in the correlation processing of the displaced images of this object and the false peak would result in an erroneous action of the focus detecting device.

There is another known detecting method applicable to a focus detecting device. This method is called an image sharpness detecting method. In the image sharpness detecting method, the sharpness of an image formed on the prescribed image plane of the photo-taking lens is detected by a plurality of light sensitive elements arranged in front and in rear of the prescribed image plane in order to detect the focusing condition of the lens. The image sharpness detecting method has a high degree of detection accuracy when the lens is in the vicinity of an in-focus condition. However, by this method it is hardly distinguishable whether the focused image is positioned forward to the prescribed image plane or backward to the prescribed image plane when an image blurs to a great degree on a prescribed image plane with a telephoto lens or the like used.

In view of these advantages and disadvantages of the prior art methods, attempts are now being made to contrive some focus detecting device that is arranged based on both the above-stated detecting methods to have the advantages of the two methods and is free from any of the disadvantages mentioned above for the detection of an in-focus condition. For this purpose, there is a strong demand for some simple optical system that uses light fluxes from a photo-taking lens and is capable of forming images therefrom according to the different detecting methods.

SUMMARY OF THE INVENTION

It is therefore an object of the invention to provide a focus detecting device wherein a secondary imaging optical system is arranged such that an object's image formed on a prescribed image plane of a photo-taking lens is formed once again into two non-superposed images symmetrically divided relative to the optical axis of the lens; there is provided light splitting means which splits a light flux from the exit pupil of the photo-taking lens into a central light flux portion and a peripheral light flux portion; and an object's image which becomes necessary according as the F-number of the exit pupil of the photo-taking lens varies or an object's image which permits simultaneous use of a plurality of different detecting methods can be obtained by the use of the secondary imaging optical system for improvement in focus condition detecting accuracy with compact structural arrangement.

The above and further objects and features of the invention will become apparent from the following detailed description of preferred embodiments thereof taken in conjunction with the accompanying drawings.

BRIEF DESCRIPTION OF THE DRAWINGS

FIG. 12 is a flow chart showing the focusing operation of the fourth embodiment example.

FIGS. 13(a) and (b) are plan views showing the arrangement of light sensitive elements.

DETAILED DESCRIPTION OF PREFERRED EMBODIMENTS

Figure 2:
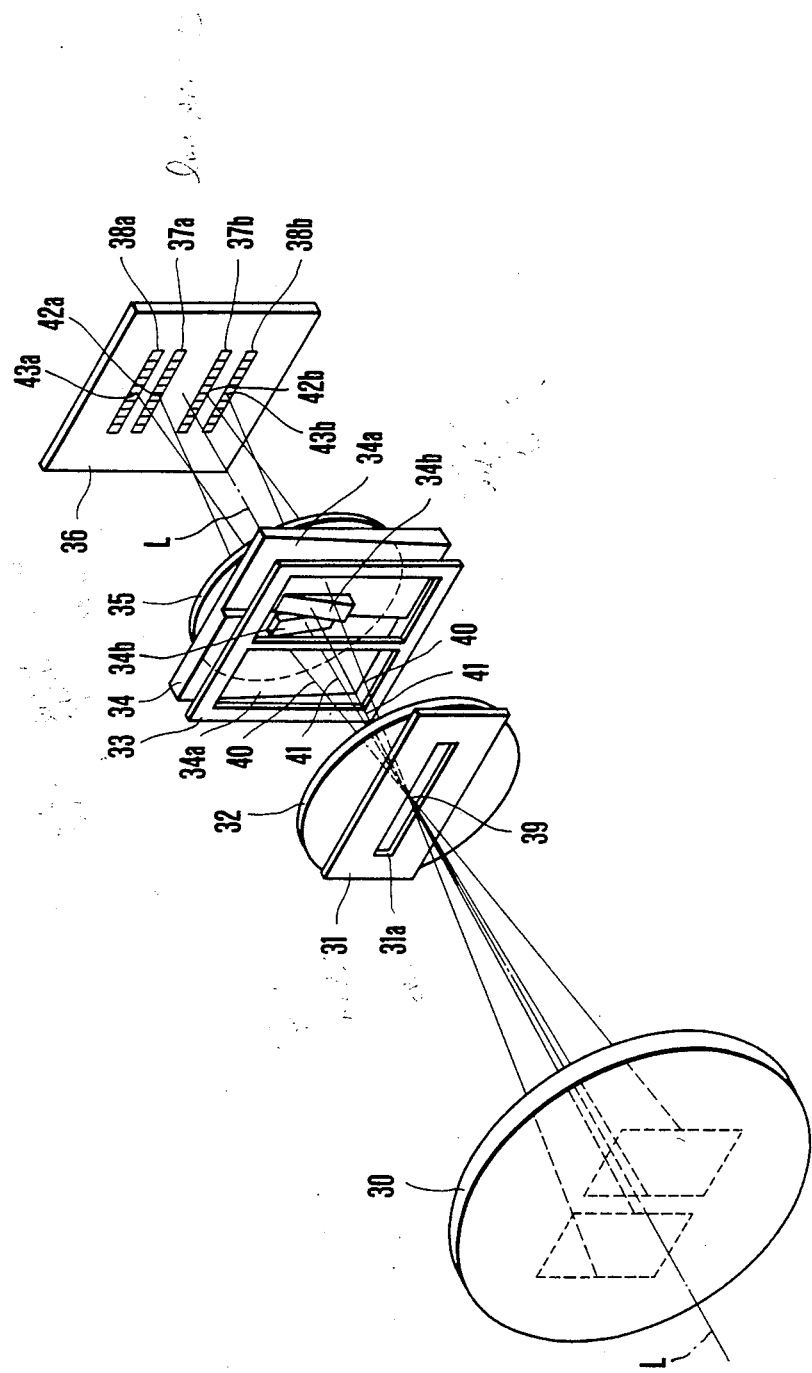
FIG. 2 is an oblique view showing the optical system of a focus detecting device as a first embodiment example of the present invention.

FIG. 2 schematically shows the optical system of a focus detecting device as a first embodiment example of the present invention. The embodiment includes a photo-taking lens 30 which is arranged to be attachable to and detachable from the body of a camera (not shown); a visual field limiting member 31 which is disposed within the camera body in a position optically conjugate with a film plane surface and has a slit-like opening 31a formed in the middle part thereof; a filed lens 32; a stop frame 33 which is provided with apertures symmetrically arranged relative to the optical axis of the photo-taking lens 30 to restrict the width of a light flux transmitted to a secondary imaging lens 35; and light splitting means 34 consisting of two light deflecting parts 34a and 34b. Each of the light deflecting parts 34a and 34b is composed of two prisms which are arranged with their vertex angles directed to opposite directions. Each pair of the light deflecting parts 34a and 34b are arranged to deflect incident light fluxes in two directions at the same angle on two sides of the optical axis L of the photo-taking lens 1, that is, these incident light fluxes are deflected symmetrically relative to the optical axis L. Further, the light deflecting parts 34a and 34b are arranged to emit incident light fluxes in the same direction at different deflection angles. In this specific embodiment example, one light deflecting part 34b is disposed on the other light deflecting part 34a. However, this arrangement may be changed in such a way as to have the light deflecting part 34b buried in the other light deflecting part 34a. The secondary imaging lens 35 is arranged to image the slit-like aperture 31a on a light sensitive element substrate 36. In the case of FIG. 2, the slit-like aperture 31a is re-imaged by the light splitting means 34 into four images on the light sensitive element substrate 36 in a symmetrical array with the optical axis L centered. The four images of the slit-like aperture 31a are detected by four line sensors 37a, 37b, 38a and 38b, each consisting of a plurality of light sensitive elements. Meanwhile, the slit-like aperture 31a is located in the vicinity of the image plane of the photo-taking lens 30. The photo-taking lens 30 causes four images of an object to be formed respectively at the light sensitive elements 37a, 37b, 38a and 38b on the light sensitive element substrate 36.

While this particular embodiment is arranged to make the object's image of the photo-taking lens 30 into four object's images by the light splitting means 34, the object's image may be arranged to be re-imaged into more than four images and the re-imaged images may be selectively used according to the purposes as will be further described herein.

An object's image formed in the neighbourhood of the slit-like aperture 31a is once again formed via the secondary imaging lens 35 on the surfaces of the above-stated light sensitive elements 37a, 37b, 38a and 38b. In this instance, however, the light splitting means 34 causes rays of light coming from the inner sides and the outer sides of the exit pupil of the photo-taking lens 30 to be imaged at different positions of the light sensitive element substrate 36. Rays of light 40 which come from the outer sides of the exit pupil enter wedge-like prism regions of the light deflecting parts 34a of the light splitting means 34 and then are deflected there according to the wedge angle of the wedge prism. As a result, the rays of light 40 are imaged by the secondary imaging lens 35 at points 42a and 42b on the surfaces of the light sensitive elements 37a and 37b.

Meanwhile, rays of light 41 from inner parts of the photo-taking lens 30 relatively close to the optical axis thereof come to enter the wedge-like prism regions of other light deflecting parts 34b of the light splitting means 34. They are deflected there and then are further deflected by the wedge prisms of the light deflecting parts 34a. After that, they are imaged by the secondary imaging lens 35 at points 43a and 43b on the surfaces of the light sensitive elements 38a and 38b.

Further, the rays of light 41 may be arranged not to pass through the light deflecting parts 34a by changing the above-stated arrangement in such a way as to bore holes in the light deflecting parts 34a and to have the light deflecting parts 34b formed in the bored parts.

An optical member 32 which is called a field lens is disposed in the neighbourhood of the imaging plane of the photo-taking lens 30. This field lens 32 causes the light splitting means 34 imaged in the neighbourhood of the exit pupil of the photo-taking lens 30. In order that a focus detecting operation is accomplished with high degree of accuracy, the field lens 32 is preferably arranged to have such a refracting power as to bring the light splitting means 34 completely within the diameter of the exit pupil of the photo-taking lens 30. The images on the surfaces of the light sensitive elements 37a and 38a are arranged to be formed by light fluxes passed through one side of the exit pupil of the photo-taking lens 30 relative to the optical axis L while the images on the surfaces of the light sensitive elements 37b and 38b are arranged to be formed by light fluxes passed through the other side of the exit pupil. When the light splitting means 34 is imaged by the field lens 32 in the vicinity of the exit pupil of the photo-taking lens 30, the relation of the two is as shown in FIG. 3.

Figure 3:
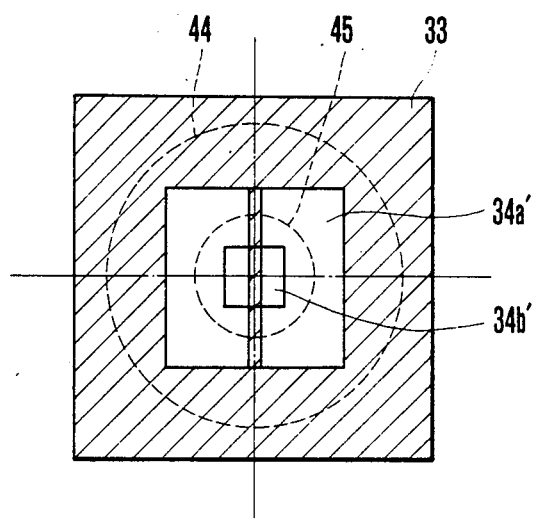
FIG. 3 is a plan view showing the essential part of the first embodiment.

In FIG. 3, reference numerals 44 and 45 denote the exit pupil diameters of different interchangeable photo-taking lenses. The exit pupil diameter 44 represents an outside diameter obtained from a bright (small max. F-number) photo-taking lens 30 and the other exit pupil diameter 45 an outside diameter obtained from a dark (large max. F-number) photo-taking lens 30. Numerals 34a' and 34b' denote the projected sizes of the two light deflecting parts 34a and 34b of the light splitting means 34 when they are projected in the neighbourhood of the exit pupil of the photo-taking lens 30. Since the light deflecting parts 34a and 34b are square in shape, the projected shapes 34a' and 34b' of the light deflecting parts 34a and 34b are also square. The image of the light deflecting parts 34a of the light splitting means 34 is arranged to be within the exit pupil diameter 44 when the photo-taking lens 30 is a bright lens while the image of the light deflecting part 34b is arranged to be within the exit pupil diameter 45 when the photo-taking lens 30 is a dark lens and the exit pupil diameter thereof is small.

Each of the light deflecting parts 34a and 34b of the light splitting means 34 is thus arranged to be included within the exit pupil diameter of the photo-taking lens 30 and the outputs of the light sensitive elements 37a, 37b, 38a and 38b are selectively used according to the F-number of the photo-taking lens 30. This arrangement insures that light fluxes efficiently used for focus detection and that the focus detection can be accomplished with a high degree of accuracy.

Further, the sizes of the images of the light deflecting parts 34a and 34b are preferably arranged to be somewhat smaller than the exit pupil diameters 44 and 45 in consideration of the difference in the distance of the exit pupil between different interchangeable photo-taking lenses 30, eccentric error of pupil, displacement of pupil due to shifting of the photo-taking lens 30 for focusing, etc.

It is preferable for accurate focus detection to have the four images of the object formed independently of each other on the surfaces of the light sensitive elements 37a, 37b, 38a and 38b. Therefore, the embodiment is provided with the vasual field limiting member 31 which has the slit-like aperture 31a and is disposed in the vicinity of the image plane of the photo-taking lens 30. The shape of the slit-like aperture 31a is arranged to be in conformity with the shape of the light sensitive elements 37a, 37b, 38a and 38b. Its shape should be varied according as the shape of these light sensitive elements 37a, 37b, 38a and 38b varies.

Figure 1A:
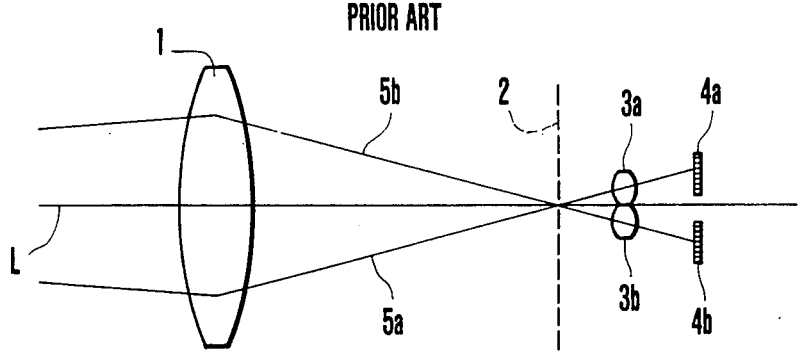
FIGS. 1(a), (b) and (c) are schematic illustrations showing the optical systems of conventional focus detection devices.
Figure 1B:
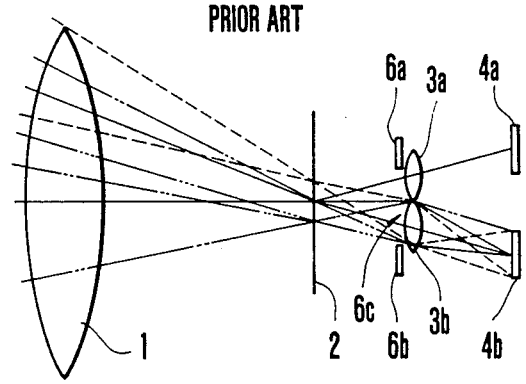
Figure 1C:
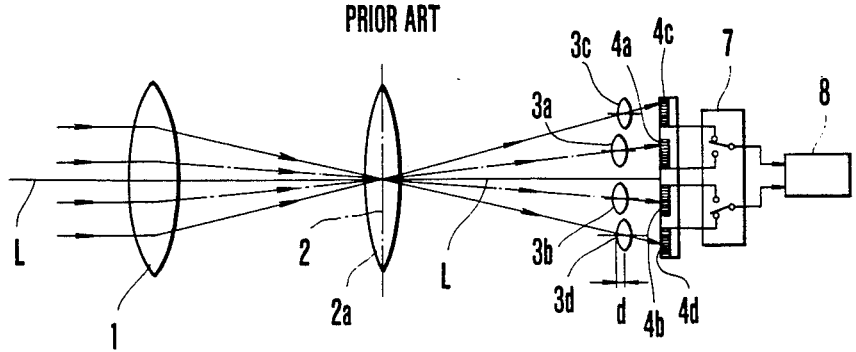

The focus detecting operation of the embodiment is performed in the same manner as the methods shown in FIGS. 1(a)–(c). More specifically stated, when the photo-taking lens 30 is in an in-focus state, the object's image of the photo-taking lens 30 is formed on the surface of the visual field limiting member 31 and four images of the object are further formed jointly by the light splitting means 34 and the secondary imaging lens 35 at predetermined parts on the light sensitive element substrate 36. When the photo-taking lens 30 is in a defocus state, the object's image is not formed on the surface of the visual field limiting member 31. Therefore, the four images of the object to be formed by the light splitting means 34 and the secondary imaging lens 35 on the light sensitive element substrate 36 are displaced in position from which they are formed when the photo-taking lens 30 is in the in-focus state.

Therefore, the focusing condition of the photo-taking lens 30 is detectable by detecting the relative imaging positions of the four images of the object by means of the light sensitive elements 37a, 37b, 38a and 38b. This arrangement also enables one to detect the extent of defocus of the photo-taking lens 30.

In case where the exit pupil of the photo-taking lens 30 is larger than the exit pupil 44 shown in FIG. 3, all the output signals from the light sensitive elements 37a, 37b, 38a and 38b can be used for efficient utilization of light fluxes for focus detection. Generally, however, there is provided a switch which can be operated according to the exit pupil of the photo-taking lens 30 mounted on the camera body, for example, as represented by a switch 7 in FIG. 1(c). With the switch provided, the output signals of the pair of light sensitive elements 37a and 37b which are located at parts where light fluxes passed through the light deflecting parts 34a are imaged can be used for focus detection when the exit pupil of the photo-taking lens 30 is larger than the exit pupil 44 of FIG. 3; while the output signals of the pair of light sensitive elements 38a and 38b located at parts where light fluxes passed through the light deflecting parts 34b are imaged can be used for focus detection when the exit pupil of the photo-taking lens 30 is between the exit pupils 44 and 45 of FIG. 3. In other words, either the four light sensitive elements 37a, 37b, 38a and 38b or the pair of the light sensitive elements 37a and 37b are used for focus detection in the case of an F-number of the photo-taking lens 30. In case where a dark photo-taking lens 30 which is of a relatively deep depth of focus is used, another pair of light sensitive elements 38a and 38b are used for focus detection. With this arrangement employed, uniform light quantity distribution is insured for the light sensitive elements irrespectively of changes in the photo-taking lenses 30 used. Then, focus detection accuracy can be enhanced with the outputs of such light sensitive elements used for focus detection. As will be apparent from the above description, the two pairs of light sensitive elements provided in this example of embodiment can be readily selected in accordance with the brightness (F-number) of the photo-taking lens either by mechanical means or electrical means.

In cases where interchangeable lenses of different degrees of brightness (maximum F-numbers) are to be used, the selection of the light sensitive elements either can be accomplished by electrically shifting the position of a switch for input to a focus detection processing system by means of a signal obtained from a maximum F-number pin provided on the interchangeable photo-taking lens or can be accomplished by operating a change-over switch mounted on the camera body.

In this embodiment example, if the light sensitive elements 37a and 38a are composed of the same size of light sensitive element while the light sensitive elements 37b and 38b are also composed of the same size of light sensitive element, focus detection can be accomplished by using a signal obtained by adding up the output signals of the light sensitive elements 37a and 38a and a signal obtained by adding up the output signals of the light sensitive elements 37b and 38b.

Figure 4:
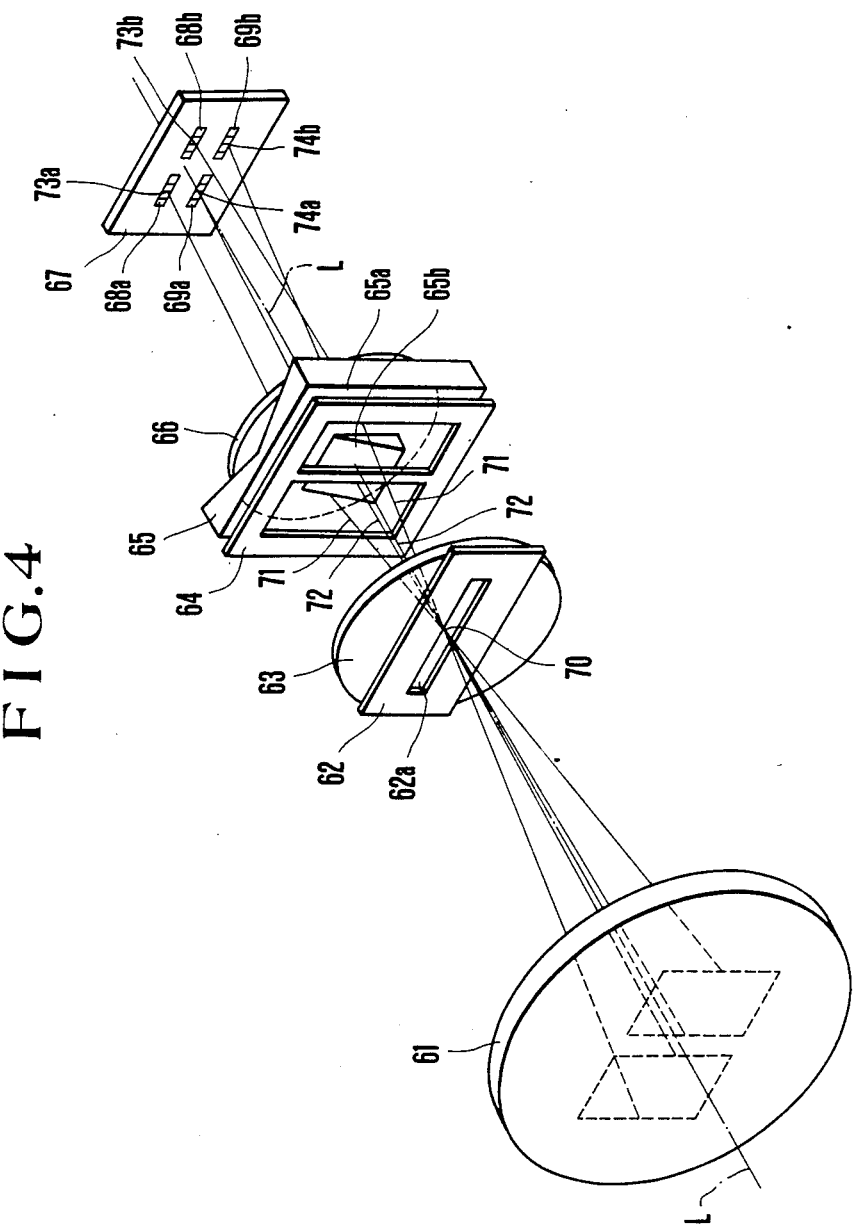
FIG. 4 is an oblique view showing the optical system of a focus detecting device as a second embodiment example of the invention.

FIG. 4 schematically shows the optical system of a second embodiment example of the invention. The drawing includes a photo-taking lens 61; a visual field limiting member 62 which has a slit-like aperture 62a in the middle part thereof; a field lens 63; a stop frame 64 having apertures for restricting light fluxes to be transmitted to a secondary imaging lens; light splitting means 65 consisting of two light deflecting parts 65a and 65b; the secondary imaging lens 66; and a light sensitive element substrate 67 which has four light sensitive elements 68a, 68b, 69a and 69b arranged thereon. While the light fluxes are deflected only in one direction in the case of the preceding embodiment example shown in FIG. 2, the light splitting means 65 in this second embodiment example is arranged to deflect light fluxes symmetrically in upward, downward, left and right directions with the optical axis of the photo-taking lens 61 at the center. The rest of arrangement is identical with the embodiment shown in FIG. 2.

In the light flux from the photo-taking lens 61 which is imaged at one point 70 of the slit-like aperture 62a of the visual field limiting member 62, rays of light 71 which come from the outer sides of the exit pupil pass through and are deflected by light deflecting parts 65a which are formed by wedge prisms. The rays of light 71 are then imaged via the second imaging lens 66 at points 73a and 73b on the surfaces of the light sensitive elements 68a and 68b. Meanwhile, rays of light 72 which come from inner sides of the exit pupil are deflected by light deflecting parts 65b which are formed by prisms. The rays of light 72 thus deflected are again deflected, in the direction perpendicular to the deflecting direction of the light deflecting parts 65b, by light deflecting parts 65a which are formed by wedge prisms. Then, the rays of light 72 are imaged at parts 74a and 74b on the surfaces of the light sensitive elements 69a and 69b via the secondary imaging lens 66.

In the second embodiment example, the object's images on the surfaces of the light sensitive elements 73a and 73b are formed in the longitudinal direction of the slit-like aperture 62a. Therefore, compared with the light deflecting part 34a of the first embodiment example shown in FIG. 2, the wedge angle of the prism of the light deflecting part 65a is arranged to be large.

The wedge angle of the prisms used for the light deflecting parts 65a and 65b of the light splitting means 65 is preferably arranged to be at such an angle that the images of the slit-like aperture 62a of the visual field limiting member 62 do not interfere with each other on the surface of the light sensitive element substrate 67.

In the case of the second embodiment example, the light sensitive elements 68a and 68b are arranged in line with each other. Therefore, they may be replaced with a longer light sensitive element by dividing it into two. The same alternative arrangement is applicable also to other light sensitive elements 69a and 69b.

In this embodiment example, focus detection can be accomplished by selectively using the output signals of the light sensitive elements according to the brightness of the photo-taking lens 61 in the same manner as in the preceding embodiment example shown in FIG. 2. More specifically, when the photo-taking lens is of a small maximum F-number and has a large exit pupil, the output signals of the light sensitive elements 68a and 68b or the sum of the signals of the light sensitive elements 68a and 69a and the sum of the signals of the light sensitive elements 68b and 69b are used for focus detection. In the case of the photo-taking lens of a large maximum F-number having a small exit pupil, the signals produced from the light sensitive elements 69a and 69b are used for focus detection. This arrangement gives accurate results of focus detection.

Figure 5:
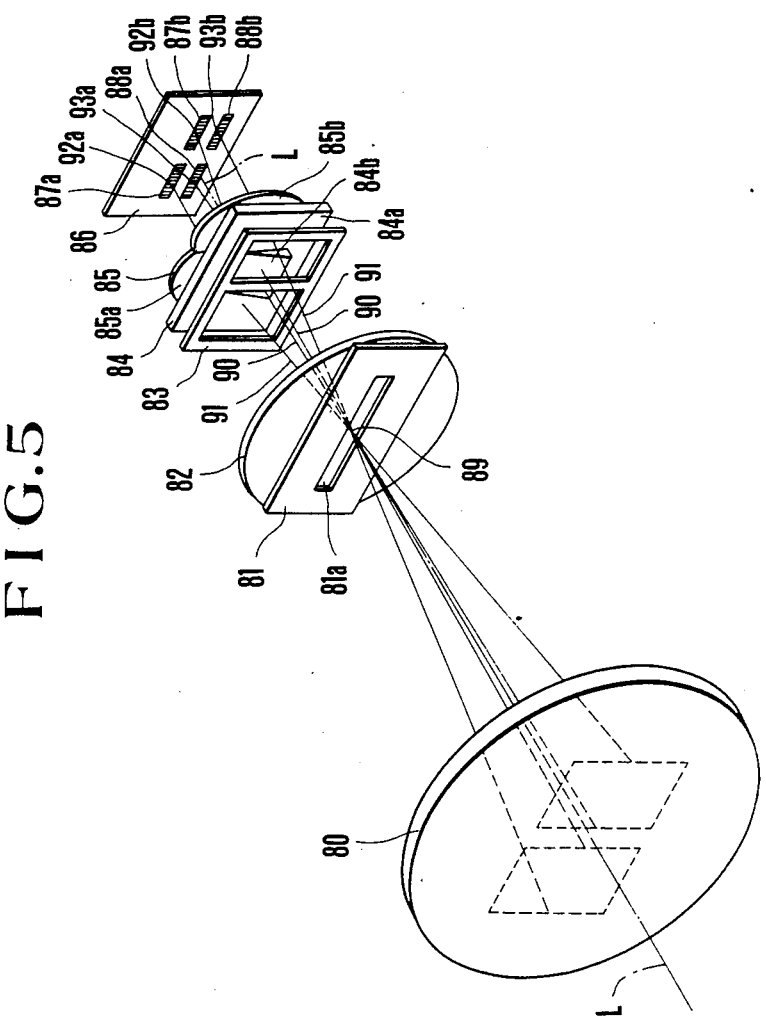
FIG. 5 is an oblique view showing the optical system of a focus detecting device as a third embodiment example of the invention.

FIG. 5 schematically shows the optical system of a third embodiment example of the invention. In this case, a portion of the secondary imaging lens is arranged to perform the function of one of the light deflecting parts of the light splitting means. Referring to FIG. 5, light splitting means 84 is provided with one light deflecting part 84b which is formed by a prism disposed on a flat plate 84a. Meanwhile, a secondary imaging lens 85 is composed of two imaging lenses 85a and 85b. The optical axis of each of the imaging lenses 85a and 85b is deviated sidewise from the optical axis L of a photo-taking lens 80 in such a manner that they function as light deflecting parts. The rest of the arrangement of this embodiment example is similar to the embodiment example shown in FIG. 4.

The third embodiment example includes the phototaking lens 80; a visual field limiting member 81 which is disposed on the prescribed image plane of the phototaking lens 80 and has a slit-like aperture 81a; a field lens 82; a stop frame 83 provided with apertures for restricting light fluxes incident on the secondary imaging optical system; a substrate 86 for light sensitive elements; and the light sensitive elements 87a, 87b, 88a and 88b.

When the photo-taking lens 80 is in an in-focus state in this embodiment example, rays of light 91 which, for example, come from outer parts of the exit pupil of the photo-taking lens 80 and are included in a light flux from a center point 89 of the slit-like aperture 81a pass through the flat plate 84a and are deflected by and imaged by imaging lenses 85a and 85b. After they are thus symmetrically deflected relative to the optical axis L, they are imaged at points 92a and 92b on the surfaces of the light sensitive elements 87a and 87b. Meanwhile, rays of light 90 which come from inner parts of the exit pupil of the photo-taking lens 80 are deflected by the light deflecting part 84b of the light splitting means 84 and are further separated by the imaging lenses 85a and 85b in directions perpendicular to the deflecting direction of the light deflecting part 84b. They also receive the imaging actions of these imaging lenses 85a and 85b and are thus imaged at points 93a and 93b on the surfaces of the light sensitive elements 88a and 88b.

The selective use of the output signals of these light sensitive elements according to the F-number of the photo-taking lens 80 is arranged to be carried out in the same manner as in the case of the embodiment example shown in FIG. 2.

In accordance with this invention, the external shape of the light deflecting part of the light splitting means does not have to be square. Any other shapes are adoptable as long as they are capable of deflecting light fluxes.

Figure 6:
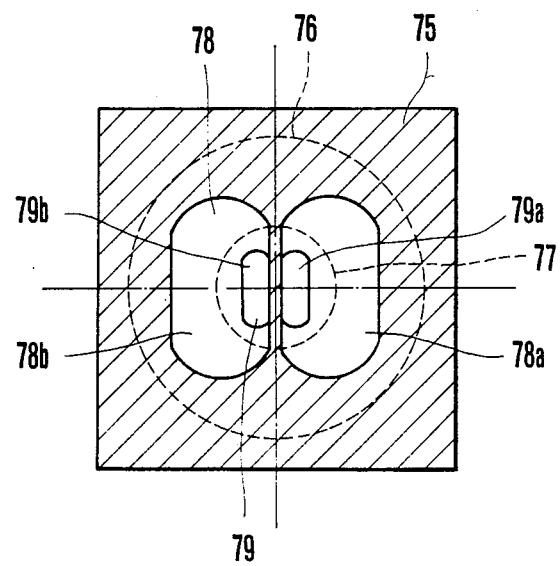
FIG. 6 is a plan view showing by way of example a modification of the light deflecting means employed in the first, second and third embodiments of the invention.

To increase the quantity of light entering the exit pupil of the photo-taking lens and incident upon the light sensitive elements, adoption of a shape for example as shown in FIG. 6 may be advantageous. FIG. 6 shows the relation of the exit pupil of the photo-taking lens to the light splitting means in the same manner as FIG. 3.

Referring to FIG. 6, the drawing includes a light flux limiting member 75; exit pupil diameters 76 and 77 of different photo-taking lenses; and light deflecting parts 78 and 79. The light deflecting parts 78 and 79 respectively consist of light deflecting elements 78a and 78b; and 79a and 79b. The elements 78a and 78b and the elements 79a and 79b are arranged perpendicularly to the longitudinal direction of the slit-like aperture of the visual field limiting member within a plane perpendicular to the optical axis of the photo-taking lens. They are arranged in axial symmetry relative to a straight line extended from the optical axis. These elements include second axes of the axial symmetry which are in parallel relative to the above-stated axis of symmetry.

As described in the foregoing, a novel light splitting means is added in the neighbourhood of the secondary imaging lens in accordance with the invention. This enables the focus detecting device to efficiently and accurately perform focus detection without necessitating the use of a complex mechanical mechanism and any additional lens systems even for bright and dark photo-taking lenses.

Further, in accordance with the invention, the problems which have resulted from the conventional arrangement to use light fluxes coming from two regions of the exit pupil of the photo-taking lens or to use four channels of the secondary imaging optical system can be solved by providing a total of four regions of the exit pupil with at least two regions added to the above-stated two regions and by using light fluxes coming from these four regions.

As for the electric processing method usable in accordance with this invention, some method that is capable of determining at least the direction in which the photo-taking lens should be moved is adoptable. For example, adoptable methods include a method proposed by one of the present applicants in Japanese Patent Application No. Sho 57-23615. In that method, assuming that the output signals of the light sensitive elements 37a and 37b shown in FIG. 2, for example, are a1, a2,–aN and b1, b2–bN, an in-focus condition determining signal V is computed by the following formula:

$$V = \sum_{i=1}^{N-k} \min\{a(i), b(i + k)\} - \sum_{i=1}^{N-k} \min\{a(i + k), b(i)\} \quad (1)$$

In the above formula, all of the photoelectric output signals a(i), b(i)(wherein i=1~N) are of positive values. Further, min{x, y} represents a smaller value between the two positive values x and y.

Figure 7:
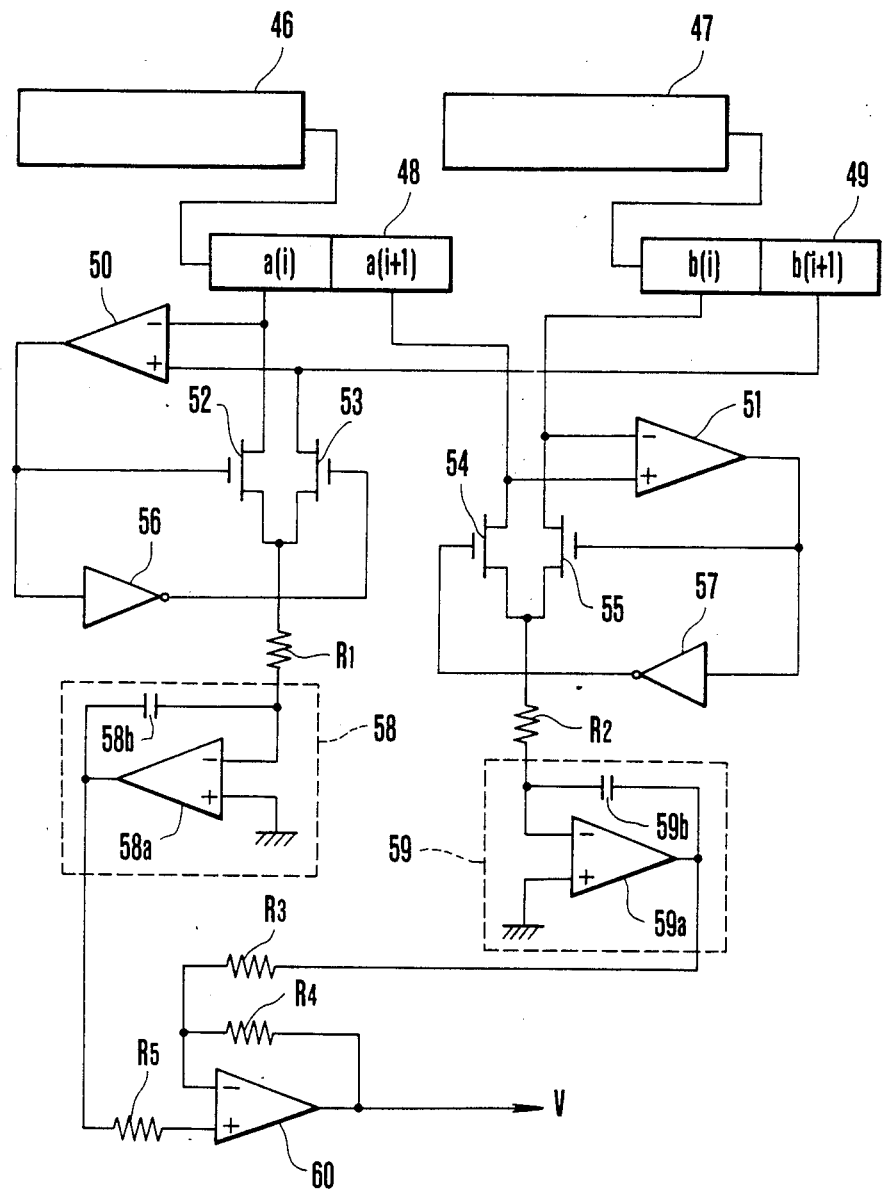
FIG. 7 is a circuit diagram showing a control circuit applicable to the first, second and third embodiment examples of the invention.

FIG. 7 shows an embodiment example in which the above-stated computation is accomplished by an analog operating circuit. Light receiving signals which are produced as time serial signals from the analog operating circuit are arranged to pass through analog shift registers 48 and 49. The light sensitive elements 46 and 47 do not have to be physically separated into two channels. Instead of that, one alignment of light sensitive elements may be used by partially dividing it. These electronic members are synchronously controlled by means of a clock pulse genration circuit. The shift registers 48 and 49 respectively hold the signals a(i) and a(i+1) and signals b(i) and b(i+1) and are connected to a comparator 50 which determines the min{a(i), b(i+1)} of the formula (1) and to a comparator 51 which determines min{a(i+1), b(i)}. The comparator 50 and an inversion circuit 56 which produces an output by inverting the output of the former oppositely control analog switches 52 and 53. As a result of that, min{a(i), b(i+1)} is produced to an integrator 58 which consists of an operational amplifier 58a and a capacitor 58b. Then, in the same manner as this, the comparator 51 and its inversion circuit 57 oppositely control analog switches 54 and 55 to produce min{a(i+1), b(i)} to another integrator 59 which consists of an operational amplifier 59a and a capacitor 59b. The outputs of the integrators 58 and 59 are supplied to a differential amplifier 60, which then produces an in-focus condition determining signal V therefrom.

Figure 8:
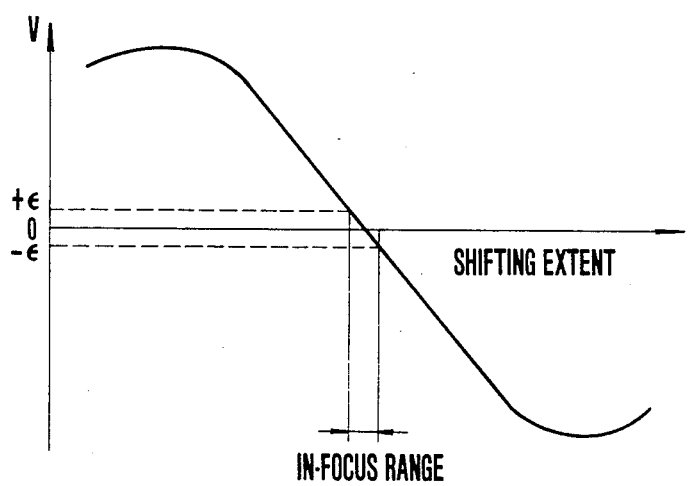
FIG. 8 is a wave-form chart showing the condition of a signal obtained from the circuit shown in FIG. 7.

In accordance with the method described above, the direction in which the photo-taking lens must be shifted for correct focusing can be determined and indicated in the event of a defocus condition of the photo-taking lens. The positive value and the negative value of V of the formula (1) indicate whether the focused image is positioned forward to the prescribed image plane or backward to the prescribed image plane respectively. Further, an in-focus condition is deemed to be attained when there obtains a relation of $|V|<\epsilon$ for a preset small constant value $\epsilon$. FIG. 8 shows the relation of the value of V to the shifting position of the photo-taking lens.

With the amount of difference between position of focused image from the prescribed image plane quantitatively obtained, the speed at which an automatic focusing servo system reaches an in-focus state can be greatly increased. Further, such a direction indicative quantity that is indicated by formula (1) above varies in absolute value with the contrast of the object to be photographed although its positive or negative sign remains unaffected by the contrast. Therefore, the in-focus range defined as $|V|<\epsilon$ fluctuates. Whereas, a result of computation of amount of difference of the position of focused image from the prescribed image plane is not affected by the contrast. Accordingly, setting of a suitable allowable value of amount of difference of the position of the focused image and the prescribed image plane gives an unconditional criterion for determination of an in-focus condition.

Figure 9:
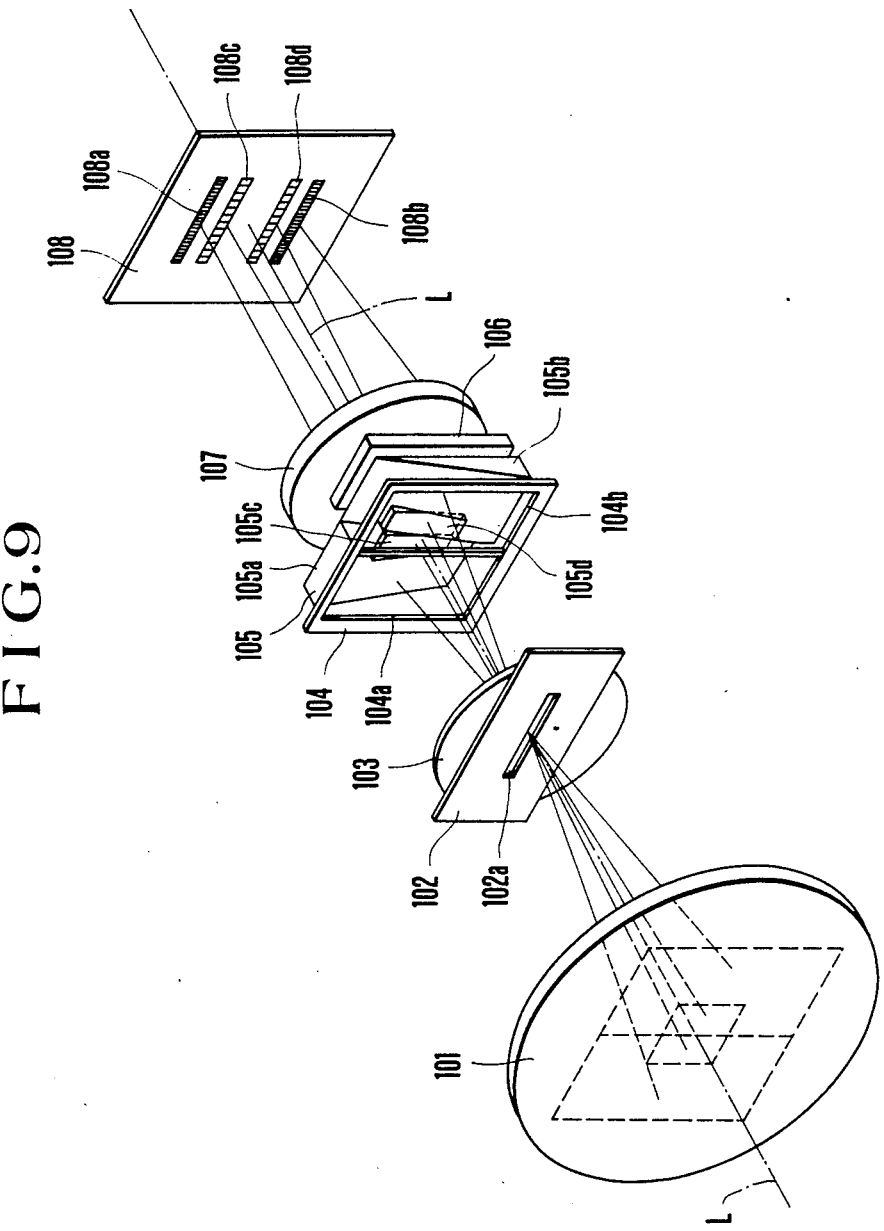
FIG. 9 is an oblique view showing the optical system employed in a focus detecting device as fourth embodiment example of the invention.
Figure 10:
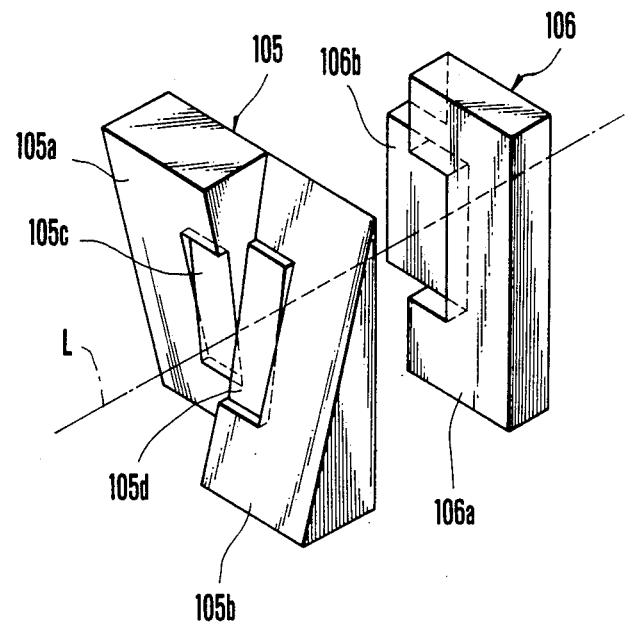
FIG. 10 is an oblique view of the essential part of the fourth embodiment example.

FIG. 9 shows a fourth embodiment example of the invention. The drawing includes a light shielding member 102 which is arranged in the neighbourhood of a prescribed image plane of a photo-taking lens 101 along the path of a light flux emitted from the lens 101; a field lens 103; a stop frame 104; a light splitting means 105; an optical path length differentiating means 106; a secondary imaging lens 107; and a sensor substrate 108. The light shielding member 102 is provided with a rectangular visual field aperture 102a. The stop frame 104 is provided with two rectangular apertures 104a and 104b. In the rear of them are disposed light deflecting prisms 105a, 105b, 105c and 105d which differ from each other in their wedge angles and slanting directions and jointly form the light splitting means 105. As shown in FIG. 10, the optical path length differentiating mechanism 106 consists of optical transparent plates 106a and 106b which respectively correspond to the prisms 105a–105d. However, the optical path length differentiating mechanism 106 does not have any part corresponding to the prism 105a. Meanwhile, the optical transparent plate 106b is arranged in a position corresponding to the prisms 105c and 105d to equalize them in thickness. On the sensor substrate are arranged light sensitive elements (or line sensors) 108a, 108b, 108c and 108d in two pairs, 108a being paired with 108b and 108c with 108d. These line sensors are arranged in parallel with the visual field aperture 102a.

Rays of light which come from an object to be photographed and pass through the photo-taking lens 101 are imaged at one point of the visual field opening 102a. Then, the rays of light come to the field lens 103. The field lens 103 images the exit pupil of the photo-taking lens 101 in the neighbourhood of the light splitting means 105. A light flux incident on the prism 105a is sharply deflected upward to be imaged on the line sensor 108a. A light flux incident on the prism 105b is sharply deflected downward to be likewise imaged on the line sensor 108b. The prisms 105c and 105d which are disposed close to the optical axis L of the photo-taking lens have smaller wedge angle. Light fluxes passed through these prisms 105c and 105d are arranged to be imaged on the line sensors 108c and 108d.

However, with the optical path length differentiating means 106 provided there, the image sharpness of the images formed on these line sensors 108a–108d are not all alike. In the case of this specific embodiment example, the secondary imaging optical system is so arranged that the light fluxes which pass through the prisms 105c and 105d to be imaged on the line sensors 108c and 108d by the secondary imaging lens 107 come to be imaged without defocus when the image formed on the prescribed image plane by the photo-taking lens 101 is correctly in focus. Compared with the light fluxes passed through the prisms 105c and 105d, the light fluxes passed through the prisms 105a and 105b are caused to have different optical path length. Therefore, as a result of that, the images on the line sensors 108a and 108b are formed with some degree of defocus.

Figure 11:
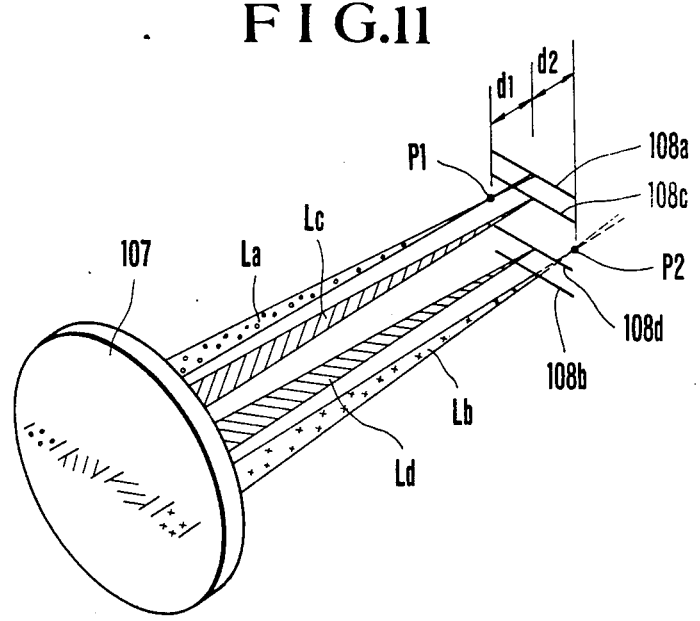
FIG. 11 is an oblique view showing the imaging condition of light fluxes obtained in the fourth embodiment example.

This relation is as shown in FIG. 11 which shows the conditions of light fluxes after they have passed through the secondary imaging lens 107. Referring to FIG. 11, light fluxes Lc and Ld which have passed the prisms 105c and 105d are caused to have the same optical path length difference through the transparent plate 106b and are thus correctly imaged on the line sensors 108c and 108d. Another light flux La which has passed through the prism 105a on the other hand is caused by optical path length differentiating means of thickness "0" to have a longer optical path length than the above-stated light fluxes Lc and Ld. As a result, the light flux La comes to be imaged at a point P1 before the line sensor 108a and thus comes to somewhat blur on the line sensor 108a. A light flux Lb which has passed the prism 105b is caused to have a shorter optical path length by the effect of the transparent plate 106a which is thicker than the transparent plate 106b. The light flux Lb thus comes to the line sensor 108b in such a way as to be imaged at a point P2 located in the rear of the line sensor 108b and thus also somewhat blurs. Assuming that distances between the imaging point of the light flux La and the sensor substrate 108 and between that of the light flux Lb and the sensor substrate 108 are d1 and d2 respectively, the optical path length differentiation according to this embodiment example is arranged to result in a relation d1=d2. Under a condition where the photo-taking lens 10 correctly forms an image on the prescribed image plane, the images formed on the line sensors 108a and 108b are thus arranged to be blurred to the same degree. When the photo-taking lens 101 is close to an in-focus state, therefore, it is distinguishable by comparing the sharpness of the images on the line sensors 108a and 108b whether the object image is focused forward to the prescribed image plane or backward to the prescribed image plane. A signal processing required for such sharpness detection may be accomplished for example by means of an in-focus determination processing system proposed in Japanese Laid-Open Patent Application No. Sho 55-18652 (laid-open Feb. 8, 1980).

In the event that the photo-taking lens 101 fails to correctly form an image on the prescribed image plane and the image thus formed is defocused to a great degree, the amount of movement and direction of the photo-taking lens 101 are determined by computation by detecting the displacement of the images formed on the line sensors 108c and 108d by the light fluxes Lc and Ld which passed through the prisms 105c and 105d. Then, the photo-taking lens 101 is moved to cancel the defocus condition. A signal processing required for the above-stated image displacement detection may be accomplished in accordance with the system described in the foregoing with reference to FIG. 7, though it can be accomplished by some of the varied methods previously proposed by the present applicant. When the photo-taking lens 101 approaches an in-focus state after the above-stated process, the in-focus state can be correctly determined by the image sharpness detecting method mentioned in the foregoing.

FIG. 12 is a flow chart showing the algorism employed in determining an in-focus state in accordance with this embodiment example. First, the degree of defocus is obtained by the image displacement detecting process. The position of the photo-taking lens 101 is adjusted to bring the defocus degree within a certain allowable range. After that, fine focusing adjustment is carried out by the image sharpness detecting process.

In this embodiment example, the line sensors 108a and 108b are provided for the purpose of detecting image sharpness. It is preferable to have photo-electric conversion elements of these sensors arranged in size as small as possible and densely arranged at short pitches. Other line sensors 108c and 108d are on the other hand provided for the purpose of detecting image displacement. Accordingly, their photo-electric conversion elements do not have to be of such a small size as in the case of line sensors 108c and 108d. Further, in this particular embodiment example, the length of the line sensors 108a and 108b does not have to be equal to that of other line sensors 108c and 108d. Each of the line sensors 108c and 108d which serve to detect image displacement requires a relatively long alignment of elements in order to detect a greatly defocused state. However, the line sensors 108a and 108b which serve to detect image sharpness do not require such long alignments.

Such arrangement of the line sensors 108a–108d is as shown in FIG. 13(a). Broken line blocks Aa–Ad encompassing the line sensors 108a–108d represent images formed on the sensor substrate 108 by the secondary imaging optical system. In this instance, the line sensors 108a and 108b are arranged to detect image sharpness and the line sensors 108c and 108d to detect image displacement.

In this specific embodiment example, as has already been mentioned, the light images to be formed on the line sensors 108a and 108b are blurred by the use of the optical path length differentiating means 106 even when the photo-taking lens 101 correctly forms an image on the prescribed image plane. This blurred conditions of the light images formed on the line sensors 108a and 108b result in slight displacement of the images to the left and right. In the image sharpness detecting method of the prior art, the focus detecting device cannot show sufficient performance unless the light distribution of the same portion of an object to be photographed is received by two line sensors. Whereas, in the case of this embodiment, the amount of displacement resulting from the blur is precalculatable from the differentiated optical path length, and incident angle of center ray of light fluxes coming to the line sensors. Accordingly, the length of the line sensors 108a and 108b in their longitudinal direction is predetermined in such a manner that they receive only the light of common regions of the displaced light images. Or, in a possible alternative, the device is arranged to select from the output signals of the line sensors 108a and 108b only the signals corresponding to the common regions and to supply such selected signals to an in-focus state determining signal processing circuit of the device.

This embodiment example is not limited to the arrangement of the line sensors 108a–108d as shown in FIG. 13(a). That arrangement may be replaced with the arrangement of the line sensors as shown in FIG. 13(b). In this instance, the image displacement detecting line sensors 108c and 108d are arranged on the outer sides and the image sharpness detecting line sensors 108a and 108b on the inner sides. For such arrangement of line sensors 108a–108d, the wedge angle of the deflecting prisms 105a and 105b of the light splitting means 105 shown in FIG. 10 is arranged to be smaller while that of other deflecting prisms 105c and 105d is arranged to be larger. In either case, the line sensors 108a–108d are preferably arranged symmetrically above and below the optical axis of the secondary imaging optical system because the balance of the optical performance of two images to be compared can be improved by such symmetrical arrangement.

Figure 14:
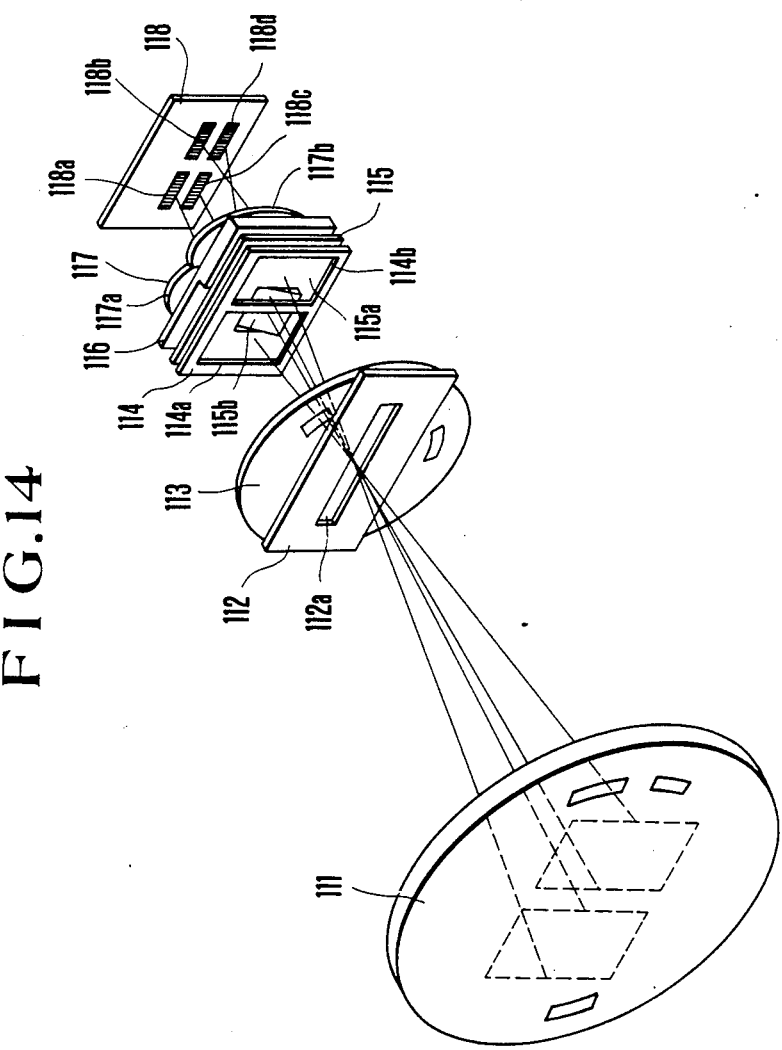
FIG. 14 is an oblique view showing the optical system of a focus detecting device as a fifth embodiment example of the invention.
Figure 15:
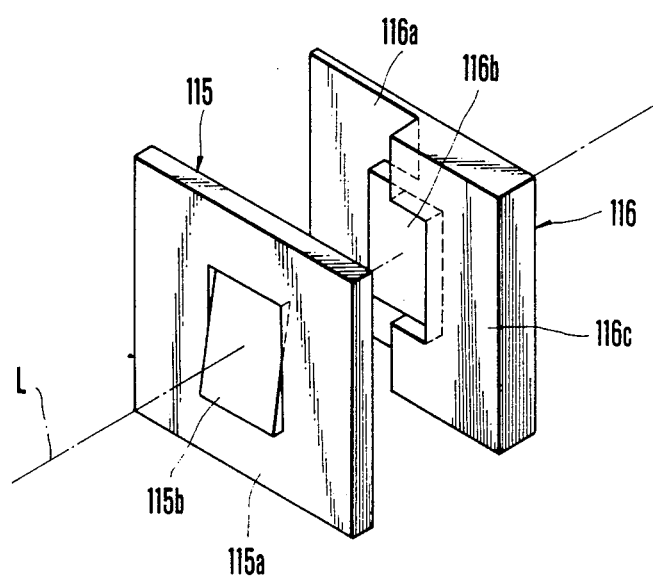
FIG. 15 is an oblique view showing the essential part of the fifth embodiment example.

A fifth embodiment example of the invention is arranged as shown in FIG. 14. The fifth embodiment differs from the fourth embodiment described in the foregoing in respect to the arrangement of a light splitting means 115, an optical path length differentiating means 116, a secondary imaging lens 117 and a sensor substrate 118. The light splitting means 115 in this case consists of a flat transparent part 115a and a small prism part 115b as shown in an enlarged view of FIG. 15. The optical path length differentiating means 116 consists of a flat plate part 116a which is of a first thickness corresponding to the left region of the above-stated transparent part 115a, a flat plate part 116b which is of a second thickness corresponding to the small prism part 115b and another flat plate part 116c which is of a third thickness corresponding to the right region of the transparent part 115a as shown also in FIG. 15. The secondary imaging lens 117 has a linear boundary part and is composed of a pair of lenses 117a and 117b. The optical axes of these lenses 117a and 117b symmetrically deviate from that of the photo-taking lens 111. A light flux which passes through the left side of the light splitting means 115 is imaged by the lens 117. Another light flux which passes through the right side of the light splitting means is imaged by the other lens 117b. These light fluxes then forms light images on different line sensors. Accordingly, in the fifth embodiment example, the lenses 117a and 117b are arranged to perform also a light splitting action. Since the light splitting means is arranged in such a different manner from the fourth embodiment example, the line sensors 118a–118d are arranged also in a different manner. In the fifth embodiment example, images due to light fluxes from inner sides of the pupil of the photo-taking lens 111 are guided to the displacement detecting line sensors 118c and 118d while light fluxes from the outer sides of the pupil of the photo-taking lens 111 are guided to the image sharpness detecting line sensors 118a and 118b. Meanwhile, the optical path length differentiating means 116 has the thickness of its flat plate part 116b determined in such a manner that: The image within the visual field aperture 112a comes to be correctly imaged on the displacement detecting line sensors 118c and 118d when the photo-taking lens 111 is in an in-focus position. Then, the thickness of the flat plate part 116c or 116a is determined to have its optical path length become shorter or longer than that of the flat plate part 116b. Therefore, despite of the difference in structural arrangement, the mechanism 116 functions in the same manner as in the fourth embodiment example. Further, the light splitting means 115 and the optical path length differentiating means 116 do not have to be separate members but may be arranged into one unified body.

As described in the foregoing, the focus detecting device according to the present invention detects image displacement by utilizing light flux portions which locate relatively close to the optical axis within the light flux emitted from the photo-taking lens. Therefore, the displacement of images on the line sensors is small even when the photo-taking lens is in a defocus state to a relatively great extent. The device according to the invention is capable of accurately detecting the direction and the amount of movement of the photo-taking lens. When the photo-taking lens comes close to an in-focus state, the device determines the in-focus state with a high degree of accuracy by detecting image sharpness. In short, the present invention combines in a simple structural arrangement the advantage of the conventional focus detecting device of the image displacement detecting type with the advantage of the conventional focus detecting device of the image sharpness detecting type.

What we claim:

1. A focus detecting device comprising:
   (a) an objective lens;
   (b) imaging means which re-images an object's image formed on a prescribed image plane of the objective lens into a plurality of secondary images of the object by splitting a light flux from the objective lens symmetrically relative to the optical axis of the objective lens;
   (c) light splitting means for splitting the light flux guided from said objective lens to said imaging means into a light flux portion from the neighbourhood of the optical axis of the objective lens and a light flux portion from outer parts of the objective lens; and
   (d) light receiving means for detecting relative positional relation of said plurality of secondary images of the object re-imaged by said imaging means.

2. A device according to claim 1, wherein said light splitting means is arranged to split said light flux by deflecting the light flux portion coming from the neighbourhood of the optical axis of said objective lens.

3. A focus detecting device comprising:
   (a) an objective lens;
   (b) first light splitting means for splitting a light flux from said objective lens symmetrically relative to the optical axis of the objective lens;
   (c) second light splitting means for splitting the light flux from said objective lens into a light flux portion from the neighbourhood of the optical axis of the objective lens and a light flux portion from outer parts of the objective lens;
   (d) an imaging lens which re-images an object's image formed on a prescribed image plane of said objective lens into a plurality of secondary images of the object on the basis of said plurality of light fluxes split through said first and second light splitting means; and
   (e) light receiving means for detecting relative positional relation of siad plurality of secondary images of the object re-imaged by said imaging lens.

4. A device according to claim 3, wherein said second light splitting means functions to split the light flux coming from said objective lens symmetrically relative to the optical axis of said objective lens.

5. A device according to claim 4, wherein each of said first and second light splitting means is composed of two wedge prisms.

6. A device according to claim 5, wherein the deflecting angle of the wedge prisms of said first light splitting means differs from that of the wedge prisms of said second light splitting means.

7. A focus detecting device comprising:
   (a) an objective lens;
   (b) light splitting means for splitting a light flux from said objective lens into a light flux portion from the neighbourhood of the optical axis of the objective lens and a light flux portion from outer parts of the objective lens;
   (c) imaging means for re-imaging an object's image formed on a prescribed image plane of said objective lens into a plurality of secondary images of the object on the basis of light fluxes guided from said objective lens via said light splitting means, said imaging means being composed of a plurality of imaging lenses the optical axes of which differ from the optical axis of said objective lens; and
   (d) light receiving means for detecting relative positional relation of said plurality of secondary images of the object re-imaged by said imaging means.

8. A device according to claim 7, wherein said light splitting means is a wedge prism.

9. A focus detecting device comprising:
   (a) an objective lens;
   (b) imaging means which re-images an object's image formed on a prescribed image plane of the objective lens into a plurality of secondary images of the object by splitting a light flux from the objective lens symmetrically relative to the optical axis of the objective lens;
   (c) light splitting means for splitting the light flux guided from said objective lens to said imaging means into a light flux portion from the neighbourhood of the optical axis of the objective lens and a light flux portion from outer parts of the objective lens;
   (d) optical path length differentiating means consisting of a first region for passing the light flux from the neighbourhood of the optical axis of the objective lens and a second region for passing the light flux from outer parts of the objective lens, said first and second regions differing in optical thickness, and said second region being arranged to have varied optical thickness when divided symmetrically relative to the optical axis of said objective lens; and
   (e) light receiving means consisting of a first light sensitive element which is arranged to detect a secondary image of the object re-imaged on the basis of the light flux passed through the first region of said optical path length differentiating means and a second light sensitive element which is arranged to detect a secondary image of the object re-imaged on the basis of the light flux passed through the second region of said optical path length differentiating means.

10. A device according to claim 9, wherein the optical thickness of the first region of said optical path length differentiating means is set at the mean value of the optical thickness values of divided parts of the second region of said optical path length differentiating means.

* * * * *